(12) United States Patent
Le Lievre

(10) Patent No.: US 7,992,553 B2
(45) Date of Patent: Aug. 9, 2011

(54) MULTI-TUBE SOLAR COLLECTOR STRUCTURE

(75) Inventor: Peter Le Lievre, North Sydney (AU)

(73) Assignee: Areva Solar Pty Limited, Singleton, NSW (AU)

( * ) Notice: Subject to any disclaimer, the term of this patent is extended or adjusted under 35 U.S.C. 154(b) by 234 days.

(21) Appl. No.: 10/597,966

(22) PCT Filed: Feb. 17, 2005

(86) PCT No.: PCT/AU2005/000208
§ 371 (c)(1), (2), (4) Date: Aug. 14, 2006

(87) PCT Pub. No.: WO2005/078360
PCT Pub. Date: Aug. 25, 2005

(65) Prior Publication Data
US 2007/0157923 A1 Jul. 12, 2007

(30) Foreign Application Priority Data

Feb. 17, 2004 (AU) .................................. 2004900786
Feb. 17, 2004 (AU) .................................. 2004900787
Feb. 17, 2004 (AU) .................................. 2004900788

(51) Int. Cl.
*F24J 3/02* (2006.01)
*F24J 2/14* (2006.01)
(52) U.S. Cl. ........ 126/635; 126/704; 126/684; 126/693; 126/569; 165/172
(58) Field of Classification Search .................. 126/635, 126/684, 692–695, 696, 704
See application file for complete search history.

(56) References Cited

U.S. PATENT DOCUMENTS

| 3,026,858 | A | * | 3/1962 | Fleischer | ...................... 122/510 |
| 3,884,217 | A | | 5/1975 | Wartes | |
| 4,022,184 | A | | 5/1977 | Anderson | |

(Continued)

FOREIGN PATENT DOCUMENTS

JP 2006038286 A * 2/2006

(Continued)

OTHER PUBLICATIONS

EIC—STIC 3700 report.*

(Continued)

*Primary Examiner* — Steven B McAllister
*Assistant Examiner* — Nikhil Mashruwala
(74) *Attorney, Agent, or Firm* — K&L Gates LLP

(57) ABSTRACT

A collector system (12) is disclosed that comprises a row of linearly conjoined collector structures (13). The collector system is arranged to be located at a level above a field of reflectors (10) and to receive solar radiation reflected from the reflectors within the field. The collector structure (13) comprises an inverted trough (16) and, located within the trough, a plurality of longitudinally extending absorber tubes (30) that, in use, are arranged to carry a heat exchange fluid. The absorber tubes (30) are supported side-by-side within the trough and each absorber tube has a diameter that is small relative to the aperture of the trough. The ratio of the diameter of each absorber tube to the trough aperture dimension is of the order of 0.01:1.00 to 0.10:1.00 and, thus, the plurality of absorber tubes functions, in the limit, effectively to simulate a flat plate absorber.

20 Claims, 5 Drawing Sheets

U.S. PATENT DOCUMENTS

| | | | | |
|---|---|---|---|---|
| 4,088,120 | A | | 5/1978 | Anderson |
| 4,141,626 | A | | 2/1979 | Treytl et al. |
| 4,144,875 | A | * | 3/1979 | Bruno et al. .................. 126/662 |
| 4,149,523 | A | | 4/1979 | Boy-Marcotte et al. |
| 4,210,463 | A | * | 7/1980 | Escher .......................... 136/246 |
| 4,220,140 | A | | 9/1980 | Francia |
| 4,291,677 | A | | 9/1981 | Monk |
| 4,333,447 | A | | 6/1982 | Lemrow et al. |
| 4,337,827 | A | * | 7/1982 | Jabsen .......................... 165/172 |
| 4,414,812 | A | * | 11/1983 | Parry ......................... 60/641.14 |
| 4,416,264 | A | * | 11/1983 | Herrick et al. ................ 126/674 |
| 4,488,540 | A | * | 12/1984 | McAlister .................... 126/570 |
| 4,505,260 | A | * | 3/1985 | Metzger ....................... 126/637 |
| 4,512,336 | A | * | 4/1985 | Wiener ......................... 126/651 |
| 4,553,531 | A | | 11/1985 | Rosende |
| 4,586,489 | A | * | 5/1986 | Voll et al. ..................... 126/655 |
| 5,275,150 | A | | 1/1994 | Lai |
| 5,860,414 | A | * | 1/1999 | Steinmann .................... 126/657 |
| 6,349,718 | B1 | | 2/2002 | Ven et al. |
| 6,752,434 | B2 | * | 6/2004 | Cummins ................. 285/124.1 |

FOREIGN PATENT DOCUMENTS

| | | |
|---|---|---|
| WO | 90/10182 A1 | 9/1990 |
| WO | 99/64795 A1 | 12/1999 |
| WO | 2005/003646 A1 | 1/2005 |
| WO | 2005/003647 A1 | 1/2005 |

OTHER PUBLICATIONS

PCT International Search Report and Written Opinion of the International Searching Authority dated May 24, 2005 for International Application No. PCT/AU2005/000208, filed Feb. 17, 2005, 5 pages.

Bernhard, R. et al. (Date Unknown). "Linear Fresnel Collector Demonstration on the PSA. Part I—Design; Construction and Quality Control," presented at the Proceedings of the 14$^{th}$ SolarPACES International Symposium, Las Vegas, USA, ten pages.

Burbidge, D. et al. (2000). "Stanwell Solar Thermal Power Project," *10$^{th}$ Symposium on Solar Thermal Concentrating Technologies*, Sydney, Australia, six pages.

Dey, C.J. (2004). "Heat Transfer Aspects of an Elevated Linear Absorber," *SOLAR Energy* 76:243-249.

Dey, C.J. et al. (2002). "Operation of a CLFR Research Apparatus," *Proceedings of the 38$^{th}$ Annual Conference of the Australian and New Zealand Energy Society, Solar 2000—From Fossils to Photons*, Brisbane, Australia, Nov. 28, 2000 through Dec. 1, 2000, pp. 516-527.

Di Canio, D.G. et al., (Apr. 1979). "Line Focus Solar Thermal Central Receiver Research Study: Final Report for Period Apr. 30, 1977-Mar. 31, 1979," FMC Corporation: Santa Clara, CA, (U.S. Department of Energy Solar Energy Under Contract DE-AC03-76ET-20426, DOE/ET/20426-1), 316 pages.

Francia, G. (1968). "Pilot Plants of Solar Steam Generating Stations," *Solar Energy* 12:51-64.

Häberle, A. et al. (Sep. 2002). "The Solarmundo Line Focussing Fresnel Collector. Optical and Thermal Performance and Cost Calculations," located at: <http://www.ise.fraunhofer.de/veroeffentlichungen/nach-jahrgaengen/2002/the-solarmundo-line-focussing-fresnel-collector-optical-and-thermal-performance-and-cost-calculations>, last visited Jul. 27, 2009, eleven pages.

Hu, E.J. et al. (2003). "Solar Power Boosting of Fossil Fuelled Power Plants," *Proceedings ISES Solar World Congress*, Goteborg. Sweden, Jun. 14-19, 2003, seven pages.

Jance, M.J. (Jun. 2003). "Experimental and Numerical Analysis of Combined Convection and Radiation Heat Transfer Within a Stratified Trapezoidal Cavity," University of New South Wales, 224 pages.

Jance, M.J. et al. (2000). "Natural Convection and Radiation within an Enclosed Inverted Absorber Cavity: Preliminary Experimental Results," *ANZSES Annual Conference—From Fossils to Photons*, Brisbane, Australia, 2000, seven pages.

Le Liévre, P. et al. (2006). "Design of 6.5 MW Solar Thermal Electricity Plant with Zero Fossil Fuel Backup," *ANZSES Annual Conference—Clean Energy?—Can Do!*, Canberra, Australia, Sep. 13-15, 2006, eight pages.

Mills, D. et al, (2004). "Design of a 240 MW$_e$ Solar Thermal Power Plant," located at <http://www.ausra.com/pdfs/Design240MWsolarthermalpowerplant_Mills_2004>, last visited on Jul. 20, 2009, eight pages.

Mills, D. (2004, e-published Apr. 24, 2003). "Advances in Solar Thermal Electricity Technology," *Solar Energy* 76:19-31.

Mills, D. et al. (Oct. 6, 2004). "Lower Temperature Approach for Very Large Solar Powerplants," *SolarPaces*, six pages.

Mills, D. et al. (Aug. 2005). "Cheaper Than Coal?" *International Solar Energy Society Solar World Congress*, Orlando, Florida, Aug. 6-12, 2005, eight pages.

Mills, D.R. et al. (Feb. 2006). "Multi-tower Line Focus Fresnel Array Project," *Journal of Solar Energy Engineering* 128(1):118-120.

Mills, D.R. et al, (Dec. 2004). "First Results from Compact Linear Fresnel Reflector Installation," *Proceedings Solar 2004, Australian and New Zealand Energy Society*, Murdoch, Dec. 2004, seven pages.

Mills, D.R. et al, (2003). "Solar Preheating of the Liddell Coal-fired Powerplant," *ANZSES Annual Conference 2003*, Nov. 26-29, 2003, pp. 600-604.

Mills, D.R. et al. (Mar. 2003), "Multi-Tower Line Focus Fresnel Arrays," *Proceedings of ISEC 2003: International Solar Energy Conference*, Manua Kea Resort, Hawaii Island, Hawaii, USA, Mar. 16-18, 2003, six pages.

Mills, D.R. et al. (2002). "Project Proposal for a Compact Linear Fresnel Reflector Solar Thermal Plant in the Hunter Valley," located at <http://solar1.mech.unsw.edu.au/glm/papers/Mills_projectproposal_newcastle.pdf>, last visited on Jul. 20, 2009, six pages.

Mills, D.R. et al. (Mar. 2000). "Compact Linear Fresnel Reflector Solar Thermal Powerplants," *Solar Energy* 68(3):263-283.

Mills, D.R. et al. (1997). "Advanced Fresnel Reflector Powerplants—Performance and Generating Costs," *Proceedings of Solar 97—Australia and New Zealand Solar Energy Society*, paper 84, pp. 1-9.

Morrison, G.L. et al. (1999). "Solar Thermal Power Systems—Stanwell Power Station Project," *ANZSES Annual Conference*, Geelong, Australia, 1999, ten pages.

Morrison, G.L. et al. (2001). "Water-in-Glass Evacuated Tube Solar Water Heaters," *Proceedings of ISES 2001 Solar World Congress*, Adelaide, Australia, Nov. 25-30, 2001, pp. 545-550.

Nitarski, M.J. et al. (Jul. 2000). "Combined Radiation and Natural Convection in a Trapezoidal Cavity Absorber: An Experimental Study," *Proceedings of the Seventh Australasian Heat and Mass Transfer Conference*, James Cook University, Townsville, Jul. 2000, pp. 251-256.

Pye, J.D. et al. (2003). "Modelling of Cavity Receiver Heat Transfer for the Compact Linear Fresnel Reflector," *ISES World Congress*, Jun. 14-19, 2003. eight pages.

Pye, J. et al. (Jul. 2003). "Convection inside the Cavity Receiver of the CLFR Concentrating Solar Power System," *7$^{th}$ Natural Convection Workshop*, Sydney, Australia, 2003, pp. two pages.

Pye, J.D. et al. (Nov. 2003). Transient Modelling of Cavity Receiver Heat Transfer for the Compact Linear Fresnel Reflector, *ANZSES Solar 2003*, Melbourne, Australia, Nov. 26-29, 2003, nine pages.

Pye, J.D. et al. (2004). "Steam-circuit Model for the Compact Linear Fresnel Reflector Prototype," *ANZSES Solar 2004: Life, the Universe and Renewables*, ten pages.

Reynolds, D.J. (2000). "Heat Transfer in a Trapezoidal Cavity Absorber for a Solar Thermal Collector," *ANZSES Annual Conference—Renewable Energy Transforming Business*, Brisbane, Australia, 2000, pp. 547-555.

Reynolds, D.J. et al. (2000). "Combined Radiation and Natural Convection in a Trapezoidal Cavity Absorber," *Proceedings 7$^{th}$ Australasian Heat Transfer and Mass Transfer Conference*, Townsville, Australia, Jun. 2000, as posted on <http:/solar1.mech.unsw.edu.au/g1m/galm-papers/7AHMTC_reynolds.pdf>, last visited on Aug. 7, 2009, six pages.

Reynolds, D.J. et al. (2001). "An Experimental and Computational Study of the Heat Loss Characteristics of a Trapezoidal Cavity Absorber," *Proceedings of ISES 2001 Solar World Congress*, Adelaide, Australia, Nov. 25-30, 2001, pp. 919-924.

Reynolds, D.J. (2002). "A Hydrodynamic Model for a Line-Focus Direct Steam Generation Solar Collector," *Proceedings of Solar*

*2002—Australia and New Zealand Solar Energy Society*—Solar Harvest, Newcastle, Australia, 2002, six pages.

Reynolds, D.J. et al. (Jan./Mar. 2004). "An Experimental and Computational Study of the Heat Loss Characteristics of a Trapezoidal Cavity Absorber," *Solar Energy* 76:229-234.

Reynolds, D.J. (2005). "A Thermal and Hydrodynamic Model for a Compact Linear Fresnel Reflector-Type Solar Thermal Collector," University of New South Wales, 291 pages.

Solar Progress (Oct. 2004). "Solar Progress Renewable Energy for Australasia," 25(3):1-36.

Solar Power Group GmbH. (2008). Technologies der Solar Power Group am Beispiel eines 10 MWe Fresenelkraftwerkes, *Presented at Solarthermische Stromerzeugung im Mittleren Lesistungsbereich*, Berlin, Germany, Nov. 20, 2008, thirty-one pages.

* cited by examiner

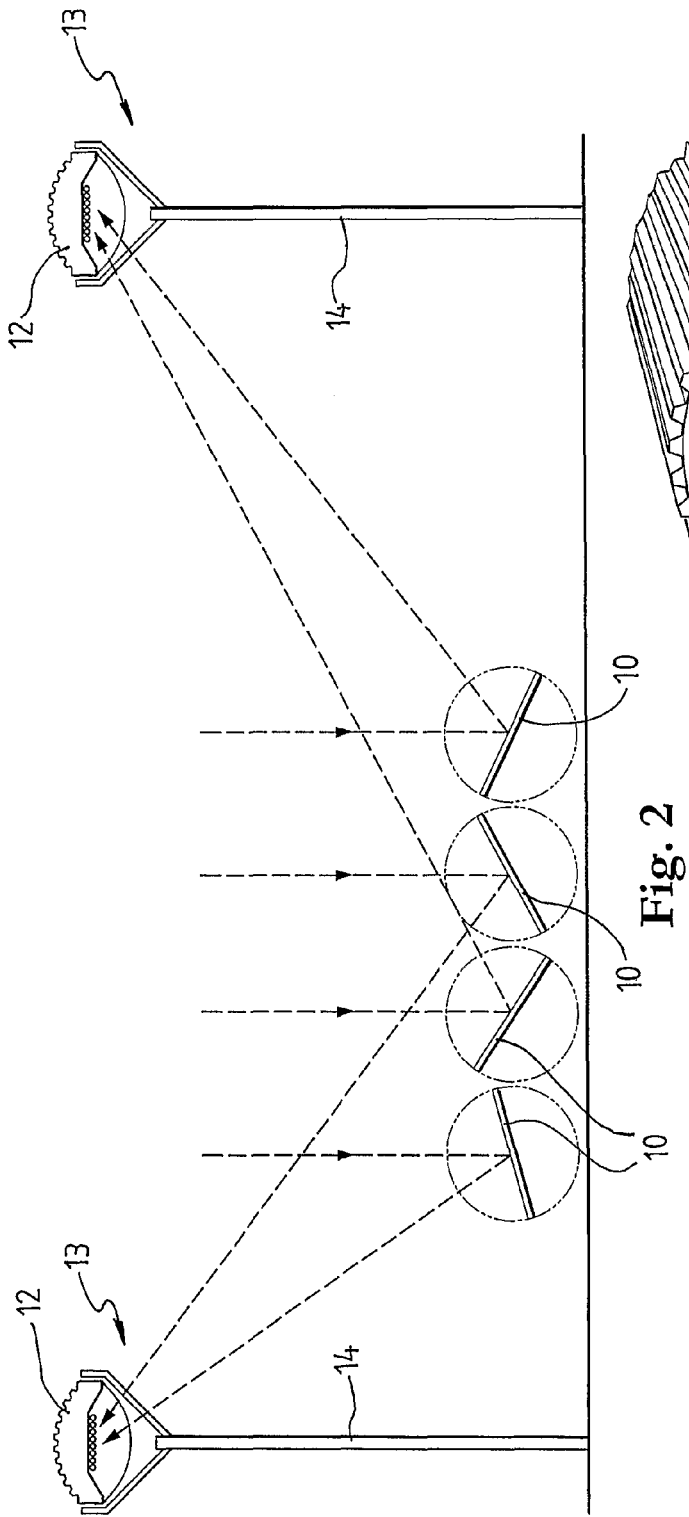
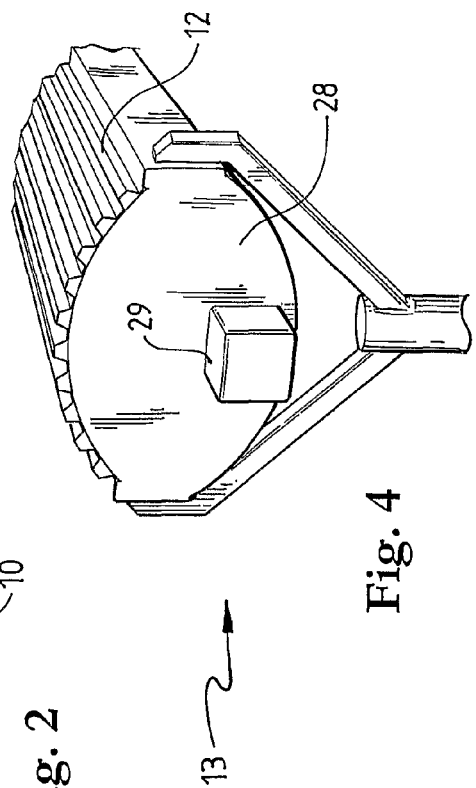

MULTI-TUBE SOLAR COLLECTOR STRUCTURE

CROSS REFERENCE TO RELATED APPLICATIONS

This application is submitted under 35 U.S.C. 371 as a U.S. National Phase application of International Patent Application Number PCT/AU2005/000208, filed Feb. 17, 2005, which claims priority to Australian Application Serial Number 2004900787, filed Feb. 17, 2004, Australian Application Serial Number 200400788, filed Feb. 17, 2004, and Australian Application Serial Number 200400786, filed Feb. 17, 2004, the contents of which are each hereby incorporated by reference as if recited in full herein for all purposes.

FIELD OF THE INVENTION

This invention relates to a solar collector structure that employs a plurality of absorber tubes that are arranged to be illuminated by solar radiation from a reflector field and to transfer absorbed energy to a heat exchange fluid that is, in use of the structure, carried by the tubes. The invention has been developed in the context of a so-called compact linear Fresnel reflector (CLFR) system and is hereinafter described in relation to such a system. However, it will be understood that the invention may have broader application.

BACKGROUND OF THE INVENTION

Prior art solar collector structures of the type with which the present invention might be compared may be categorised generally as falling within two groups; a first group that employs effectively a single absorber tube that extends along the focal line of a non-inverted trough-type reflector and a second group that employs a single absorber tube that extends along the focal line of an inverted trough-type reflector. Collector systems of the first group suffer the disadvantages that the absorber tube collects incident solar energy from one only reflector element and requires complex mounting and fluid coupling arrangements. Collector systems of the second group largely avoid the disadvantages of the first group but suffer the disadvantage of losses occasioned by the need for multiple reflections, firstly from ground-mounted reflectors and then from the inverted trough reflectors. Moreover, collector systems of the second group (if not both groups) suffer a relatively high emissivity-to-absorptance ratio as a consequence, in part, of the surface area-to-aperture ratio attributable to the relatively large diameter tube required of a single-tube collector system. Furthermore, as a secondary issue, collector systems of both the first and second groups suffer loss of operating efficiency due to movement of unconfined heated air from the interior of the trough-like reflectors. Still further, as a tertiary issue, to the extent that the collector systems of the first and second groups employ a single absorber tube, those collector systems are not capable of providing for a variable absorption aperture.

SUMMARY OF THE INVENTION

The present invention provides a collector structure that is arranged to be located at a level above a field of reflectors and to receive solar radiation reflected from reflectors within the field. The collector structure comprises an inverted trough and, located within the trough, a plurality of longitudinally extending absorber tubes that, in use, are arranged to carry a heat exchange fluid. The absorber tubes are supported side-by-side within the trough and each absorber tube has a diameter that is small relative to the aperture of the trough.

The ratio of each absorber tube diameter to the trough aperture dimension may, for example, be in the range of 0.01:1.00 to 0.10:1.00 and typically may be of the order of 0.03:1.00. With this arrangement the plurality of tubes will, in the limit, effectively simulate a flat plate absorber.

The expressions "aperture of the trough" and "trough aperture" are both intended to be understood as defining, effectively, the opening of the trough through which incident radiation may pass to impinge on the absorber tubes.

A plurality of the collector structures as above defined may be connected together co-linearly to form a row of the structures and, in such case, each of the absorber tubes will extend along the full row, either as a single length of tubing or as conjoined lengths of tubing.

OPTIONAL FEATURES OF THE INVENTION

The absorber tubes may be constituted by metal tubes and each tube may, if required, be coated over at least a portion of its surface with a solar absorptive coating. In an alternative arrangement, each absorber tube may comprise a glass or metal tubular component that is coated with a solar selective surface coating and a surrounding glass tubular component, with the space between the two tubular components being evacuated.

The inverted trough may (but need not necessarily) be located in spaced relationship below a longitudinally extending roof and, in such case, an insulating material may be located in the space between the trough and the roof.

A window that is substantially transparent to solar radiation may be employed to close (the aperture of) the trough and, in so doing, create a heat confining cavity within the trough. The window may be formed from a rigid material such as glass or it may, for example, be formed from a flexible plastics sheet material that is connected to marginal side wall portions of the trough. In this latter case the cavity may be pressurised to an extent sufficient to inflate the window in a direction away from the absorber tubes.

The heat exchange fluid may in use of the collector structure be controlled to flow in parallel, unidirectional streams through the plurality of absorber tubes. Alternatively, means may be provided for selectively varying the channelling of the heat exchange fluid into and through the plurality of absorber tubes whereby the absorption aperture of the collector structure may, in use, effectively be varied.

The invention will be more fully understood from the following description of an exemplary embodiment of the solar collector structure. The description is provided, by way of example, with reference to the accompanying drawings.

BRIEF DESCRIPTION OF THE DRAWINGS

In the drawings:

FIG. 2 illustrates schematically the reflection of solar radiation from four reflectors to two collector systems within the CLFR system;

FIG. 4 shows a perspective view (from above) of a terminal end of a collector structure of the type shown in FIG. 3;

DETAILED DESCRIPTION OF THE INVENTION

Figure 1:
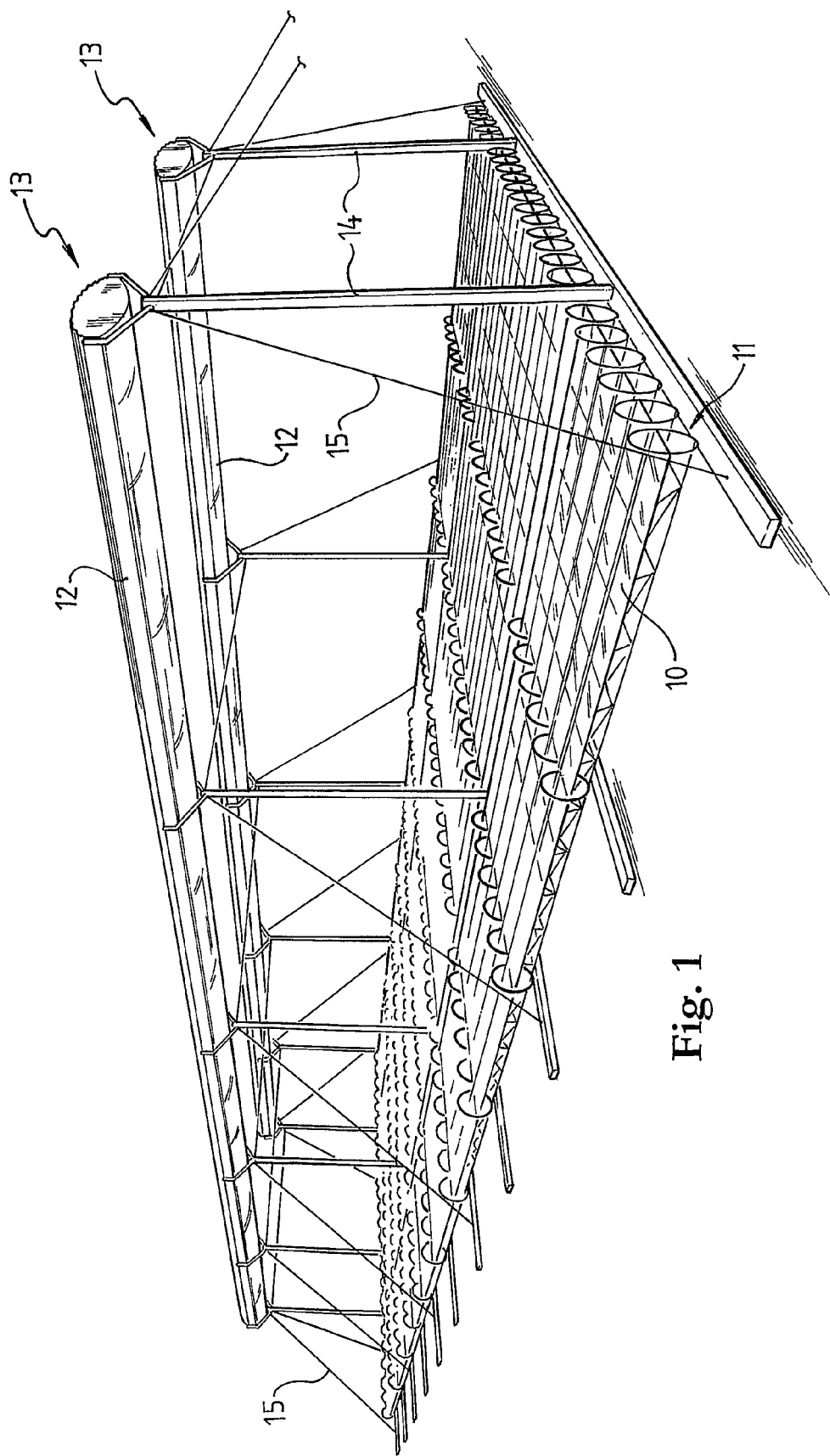
FIG. 1 shows a largely diagrammatic representation of a CLFR system that comprises a field of ground mounted reflectors that are arrayed in rows and collector systems that are constituted by rows of aligned collector structures.
Figure 3:
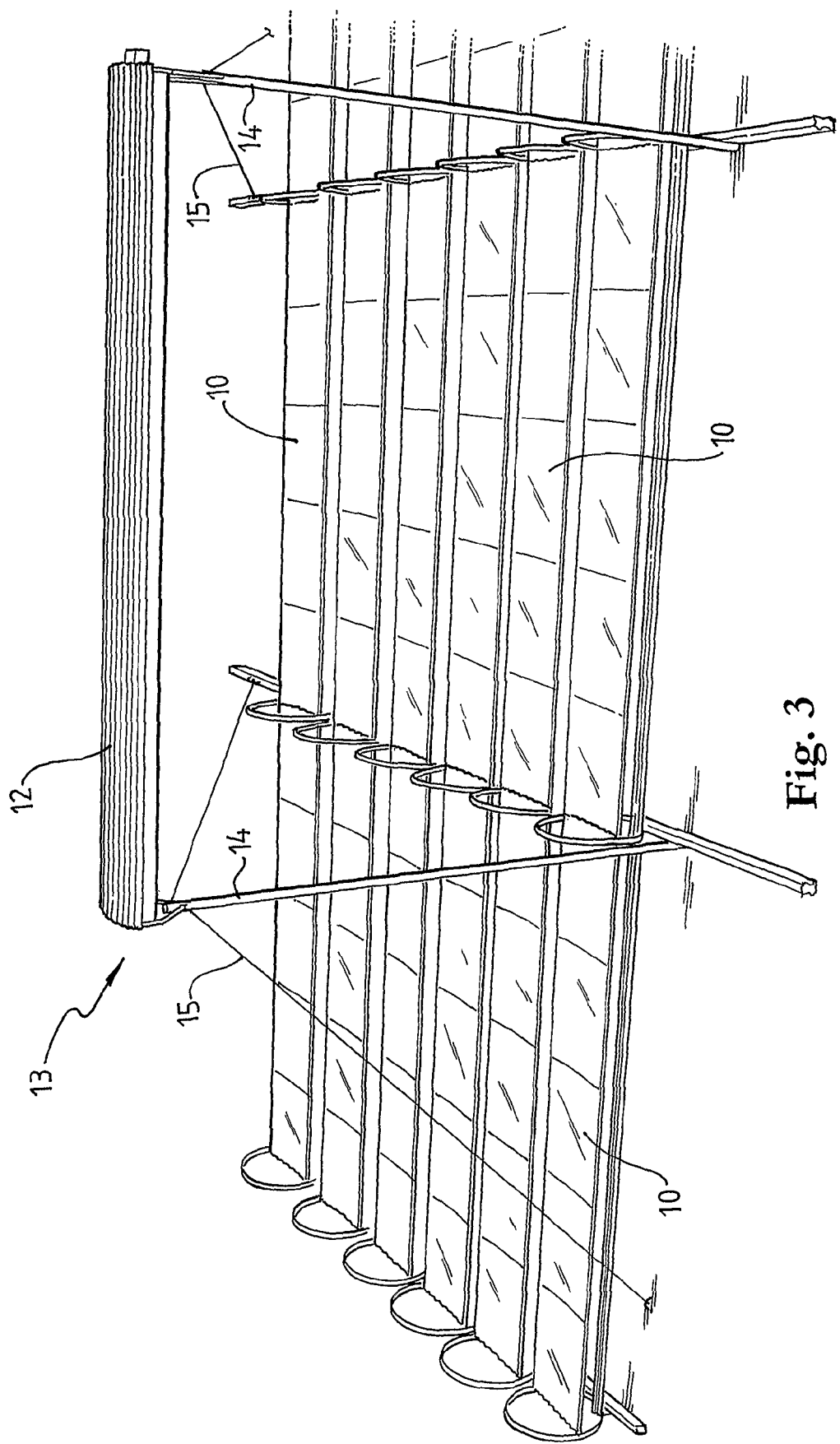
FIG. 3 shows an aerial view of a portion of a field of reflectors and a single collector structure positioned adjacent one edge of the field.

As shown in FIGS. 1 to 3, the CLFR system comprises a field of ground mounted reflectors 10 that are arrayed in rows 11 and further comprises parallel collector systems 12, each of which is constituted by aligned collector structures 13. A complete CLFR system might occupy a ground area within the range $5\times10^1$ m$^2$ to $25\times10^6$ m$^2$ and the system as illustrated in FIG. 1 may be considered as a portion only of a larger CLFR system.

The reflectors 10 may be of the type described in co-pending International Patent Applications numbered PCT/AU2004/000883 and PCT/AU2004/000884, filed 1 Jul. 2004 by the present Applicant, and the disclosures of these Patent Applications are incorporated herein by reference.

The reflectors 10 are driven collectively or regionally, as rows or individually, to track movement of the sun (relative to the earth) and they are orientated to reflect incident radiation to respective ones of the collector systems 12, as shown schematically and by way of example in FIG. 2. Also, some or all of the reflectors 10 may be driven so as to reorientate, when required, to change the direction of reflected radiation from one collector system 12 to another.

In the system as illustrated in FIG. 1, and as may typically be the case, each collector system 12 receives reflected radiation from twelve rows of reflectors 10. Thus, each collector system 12 receives reflected radiation from six rows at one side of the collector system and from six rows at the other side, although (as indicated in FIG. 2) the reflecting rows that are associated with any one receiving collector system need not necessarily be located immediately adjacent that receiving collector system.

Each row 11 of reflectors 10 and, hence, each collector system 12 might typically have an overall length of 300 meters, and the parallel collector systems 12 might typically be spaced apart by 30 to 35 meters. The collector systems 12 are supported at a height of approximately 11 meters by stanchions 14 which are stayed by ground-anchored guy wires 15, although other similar support arrangements might be employed.

As indicated previously, each of the collector systems 12 comprises a plurality of collector structures 13 that are connected together co-linearly to form a row of the structures. Each of the collector structures might typically have a length of the order of 12 meters and an overall width of the order of 1.4 meters.

Figure 5:
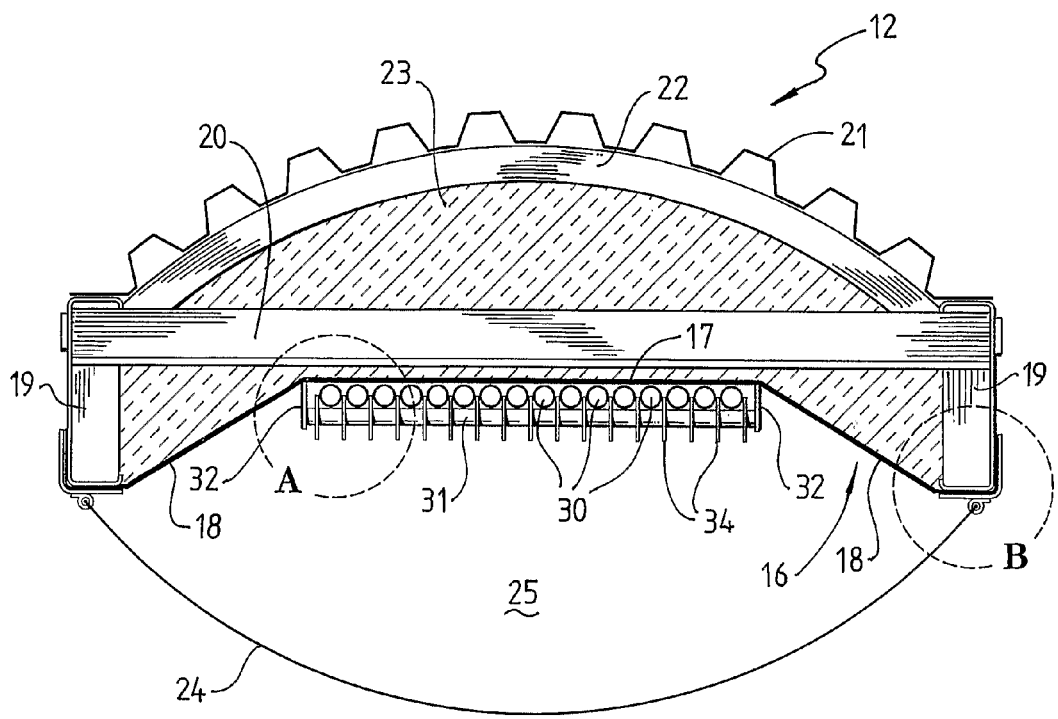
FIG. 5 shows a sectional end view of the collector structure of FIG. 4.

Each collector structure 13 comprises an inverted trough 16 which night typically be formed from stainless steel sheeting and which, as best seen in FIG. 5, has a longitudinally extending channel portion 17 and flared side walls 18 that, at their margins, define an aperture of the inverted trough. The trough 16 is supported and provided with structural integrity by side rails 19 and transverse bridging members 20, and the trough is surmounted by a corrugated steel roof 21 that is carried by arched structural members 22.

The void between the trough 16 and the roof 21 is filled with a thermal insulating material 23, typically a glass wool material, and desirably with an insulating material that is clad with a reflective metal layer. The function of the insulating material and the reflective metal layer is to inhibit upward conduction and radiation of heat from within the trough.

A longitudinally extending window 24 is provided to interconnect the side walls 18 of the trough. The window is formed from a sheet of material that is substantially transparent to solar radiation and it functions to define a closed (heat retaining) longitudinally extending cavity 25 within the trough.

Figure 7:
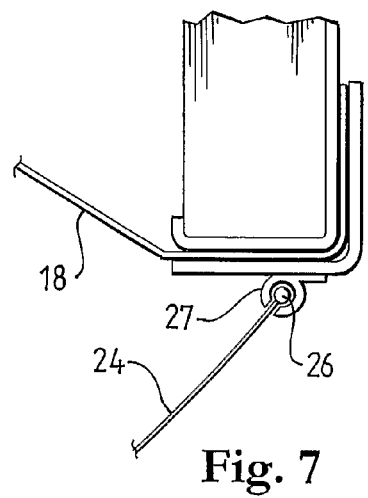
FIG. 7 shows a portion of the collector structure which is encircled by circle B in FIG. 5.

The window 24 may be formed from glass but it desirably is formed from a transparent heat resistant plastics material having a thickness of the order of $60\times10^{-6}$ m. As shown in FIG. 7, side margins of the window may be welded to a wire or other heat resistant rope core 26 and the window may be held in position by slideably locating the cored side margins in fluted side connectors 27.

FIG. 4 shows a collector structure 13 that is intended to be located at a terminal end of a row 12 of the collector structures, and it is provided with an end wall 28 to which is mounted a motor driven blower 29. The blower is provided in use to maintain a positive air pressure within the cavity 25 (relative to the ambient atmospheric pressure) and so to inflate the window in a direction away from absorber tubes 30 within the inverted trough 16.

In the collector structure as illustrated, sixteen longitudinally extending stainless steel absorber tubes 30 are provided for carrying heat exchange fluid (typically water or, following heat absorption, water-steam or steam). However, the actual number of absorber tubes may be varied to suit specific system requirements, provided that each absorber tube has a diameter that is small relative to the dimension of the trough aperture between the side walls 19 of the trough, and the collector system might typically have between ten and thirty absorber tubes 30 supported side-by-side within the trough.

The actual ratio of the absorber tube diameter to the trough aperture dimension may be varied to meet system requirements but, in order to indicate an order of magnitude of the ratio, it might typically be within the range 0.01:1.00 to 0.10:1.00. Each absorber tube 30 might have an outside diameter of 33 mm. and, with an aperture dimension of, for example, 1100 mm, the ratio of the absorber tube diameter to the aperture dimension will be 0.03:1.00.

As indicated previously, with the above described arrangement the plurality of absorber tubes 30 will, in the limit, effectively simulate a flat plate absorber, as compared with a single-tube collector in a concentrating trough. This provides for increased operating efficiency, in terms of a reduced level of heat emission from the upper, non-illuminated circumferential portion of the absorber tubes. Moreover, by positioning the absorber tubes in the inverted trough in the manner described, the underside portion only of each of the absorber tubes is illuminated with incident radiation, this providing for efficient heat absorption in absorber tubes that carry steam above water.

Figure 6:
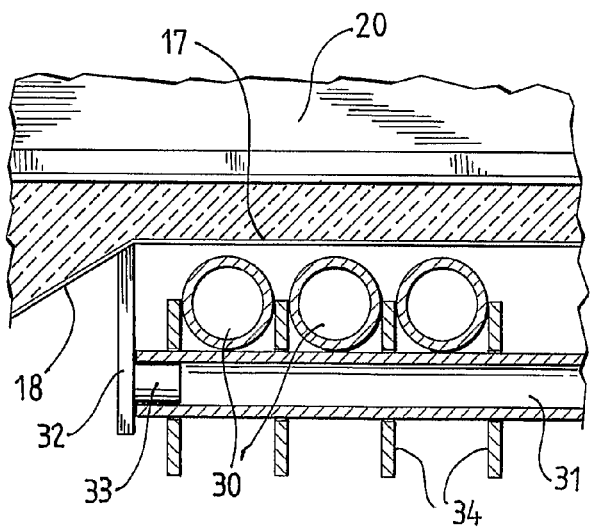
FIG. 6 shows a portion of the collector structure which is encircled by circle A in FIG. 5.

As illustrated in FIG. 6, the absorber tubes 30 are freely supported by a series of parallel support tubes 31 which extend orthogonally between side walls 32 of the channel portion 17 of the inverted trough, and the support tubes 31 are carried for rotational movement by spigots 33. This arrangement accommodates expansion of the absorber tubes and relative expansion of the individual tubes. Disk-shaped spacers 34 are carried by the support tubes 31 and serve to maintain the absorber tubes 30 in spaced relationship.

Each of the absorber tubes 30 is coated, along its length and around a (lower) portion of its circumference that is exposed to incident solar radiation, with a solar absorptive coating. The coating may comprise a solar selective surface coating that remains stable under high temperature conditions in ambient air or it may comprise a black paint that is stable in air under high-temperature conditions.

Figure 8:
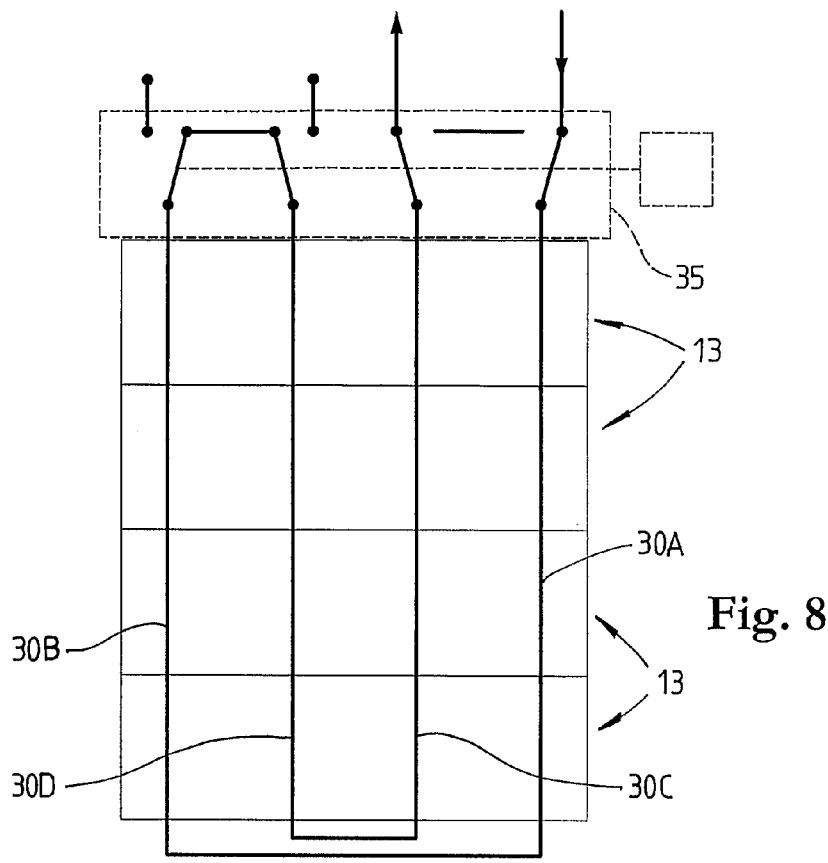
FIG. 8 shows diagrammatically a fluid flow control arrangement for a collector system that comprises a row of four interconnected collector structures.

FIG. 8 of the drawings shows diagrammatically a flow control arrangement for controlling flow of heat exchange fluid into and through four in-line collector structures 13 of a collector system. As illustrated, each of the fluid lines 30A, B, C and D is representative of four of the absorber tubes 30 as shown in FIG. 5.

Under the controlled condition illustrated in FIG. 8, inflowing heat exchange fluid is first directed along forward line 30A, along return line 30B, along forward line 30C and finally along and from return line 30D. This results in fluid at a lower temperature being directed through tubes that are located along the margins of the inverted trough and a consequential emission reduction when radiation is concentrated over the central region of the inverted trough. An electrically actuated control device 35 is provided to enable selective control over the channelling of the heat exchange fluid.

Figures 9A, 9B, 9C:
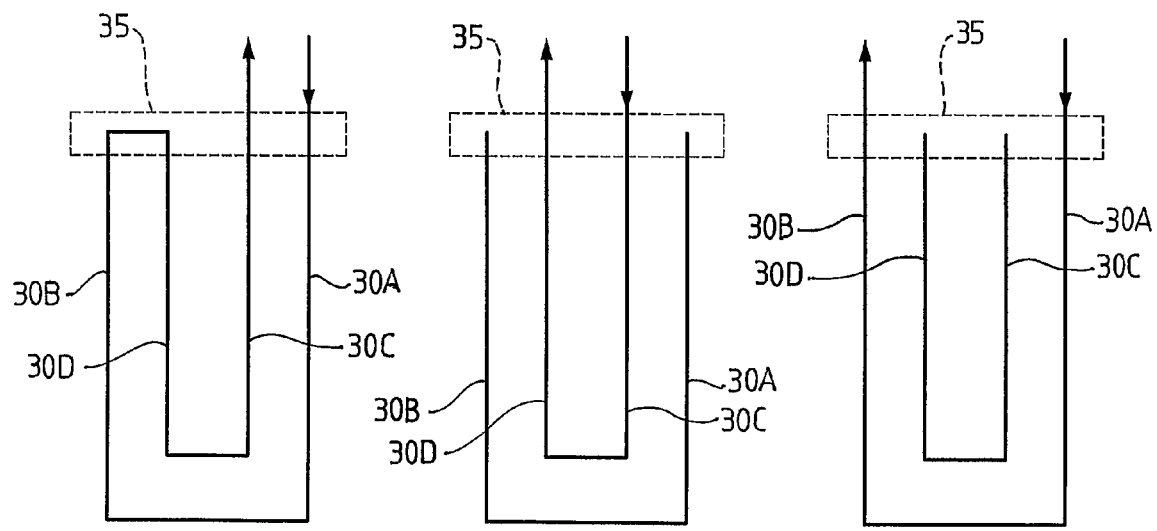
FIGS. 9A, 9B and 9C show alternative fluid channelling arrangements that provide for different effective absorption apertures.

Alternative fluid flow conditions may be established to meet load demands and/or prevailing ambient conditions, and provision may effectively be made for a variable aperture collector structure by closing selected ones of the absorber tubes. Thus, variation of the effective absorption aperture of each collector structure and, hence, of a complete collector system may be achieved by controlling the channelling of the heat exchange fluid in the alternative manners shown in FIGS. 9A to 9C.

It is to be understood that the embodiment of the invention as described with reference to the drawings is presented solely as an example of one possible form of the invention. Thus, variations and modifications may be made in the embodiment of the invention as described without departing from the spirit and scope of the invention as defined in the appended claims.

The invention claimed is:

1. A collector structure that is arranged to be located at a level above a field of reflectors and to receive solar radiation reflected from reflectors within the field; the collector structure comprising an inverted trough and, located within the trough, a plurality of longitudinally extending absorber tubes that, in use, are arranged to carry a heat exchange fluid, the absorber tubes being supported side-by-side within the trough and each absorber tube having a diameter that is small relative to the aperture of the trough, wherein the plurality of absorber tubes are freely supported by a rotatable support member which rotates about an axis that is orthogonal to the absorber tubes, and wherein said rotatable support member extends from a first side wall of a channel portion of the inverted trough to a second side wall of the channel portion of the inverted trough.

2. The collector structure as claimed in claim 1 wherein the diameter of each absorber tube to the dimension of the trough aperture has a ratio in the range of 0.01:1.00 to 0.10:1.00.

3. The collector structure as claimed in claim 1 wherein the diameter of each absorber tube to the dimension of the trough aperture has a ratio of about 0.03:1.00.

4. The collector structure as claimed in claim 1 wherein there are about ten to thirty of the absorber tubes supported side-by-side within the trough.

5. The collector structure as claimed in claim 1 wherein there are sixteen of the absorber tubes supported side-by-side within the trough.

6. The collector structure as claimed in claim 1 wherein each of the absorber tubes is constituted by a metal tube.

7. The collector structure as claimed in claim 1 wherein each of the absorber tubes is coated over at least a portion of its surface with a solar absorptive material coating.

8. The collector structure as claimed in claim 1 wherein the absorber tubes are freely supported by a series of rotatable support members which extend between side walls of the channel portion of the inverted trough.

9. The collector structure as claimed in claim 1 and incorporating a longitudinally extending roof, and wherein the inverted trough is located in spaced relationship below the roof.

10. The collector structure as claimed in claim 9 wherein an insulating material is located in the space between the inverted trough and the roof.

11. The collector structure as claimed in claim 1 wherein a window that is substantially transparent to solar radiation extends across the aperture of the inverted trough and thereby closes the trough to create a heat confining cavity within the trough.

12. The collector structure as claimed in claim 11 wherein the window is formed from a flexible plastics sheet material that is connected to marginal side wall portions of the trough.

13. The collector structure as claimed in claim 12 wherein means are provided to pressurise the cavity and thereby inflate the window in a direction away from the absorber tubes.

14. The collector structure as claimed in claim 1 wherein means are provided in use to control flow of the heat exchange fluid in parallel, linear streams through the plurality of absorber tubes.

15. The collector structure as claimed in claim 1 and including means provided for selectively varying the channeling of the heat exchange fluid into and through the plurality of absorber tubes whereby the absorption aperture of the collector structure is, in use, effectively varied.

16. A collector system comprising a plurality of the collector structures as claimed in claim 1, the collector structures being connected together co-linearly to form a row of the structures.

17. The collector system as claimed in claim 16 wherein each of the absorber tubes extends along the full row as a single length of tubing.

18. The collector structure as claimed in claim 1, wherein the trough is surmounted by a corrugated roof.

19. The collector structure as claimed in claim 1, wherein the trough is surmounted by a roof that is carried by arched structural members.

20. A solar energy collection system comprising a field of ground mounted reflectors arrayed in rows and a collector structure as claimed in claim 1 mounted above said reflectors and positioned to receive solar energy from said reflectors.

* * * * *